United States Patent [19]

Havener

[11] Patent Number: 5,654,870
[45] Date of Patent: Aug. 5, 1997

[54] BATTERY DRAWER

[75] Inventor: John Boyd Havener, Indianapolis, Ind.

[73] Assignee: Lucent Technologies Inc., Murray Hill, N.J.

[21] Appl. No.: 569,516

[22] Filed: Dec. 8, 1995

[51] Int. Cl.$^6$ .................................................. H02B 1/00
[52] U.S. Cl. ......................... 361/600; 248/27.3; 361/726; 361/727; 429/99; 429/100; 439/500
[58] Field of Search .................. 248/27.1, 27.3; 361/600, 608, 610, 614, 725–727, 826; 429/1, 7, 9, 121, 96–100; 439/500

[56] References Cited

U.S. PATENT DOCUMENTS

| | | | |
|---|---|---|---|
| 1,844,572 | 2/1932 | Gourley et al. | 361/608 |
| 2,486,764 | 11/1949 | Singer | 361/726 |
| 3,088,054 | 4/1963 | Meyer | 361/608 |
| 3,710,199 | 1/1973 | Cignoni, Jr. | 361/727 |
| 3,760,770 | 9/1973 | Weaver et al. | 119/52 B |
| 3,790,923 | 2/1974 | Mathe | 248/27.3 |
| 4,214,172 | 7/1980 | See | 307/150 |
| 4,325,106 | 4/1982 | Bartunek et al. | 362/157 |
| 5,015,546 | 5/1991 | Dulaney et al. | 429/99 |
| 5,023,824 | 6/1991 | Chadima, Jr. et al. | 364/708 |
| 5,113,183 | 5/1992 | Mizuno et al. | 340/825.31 |
| 5,225,760 | 7/1993 | Leiserson | 429/98 |
| 5,238,426 | 8/1993 | Arnett | 248/27.3 |
| 5,241,488 | 8/1993 | Chadima, Jr. et al. | 364/708.1 |
| 5,280,273 | 1/1994 | Goldstein | 340/632 |
| 5,315,478 | 5/1994 | Cadwell et al. | 361/727 |
| 5,386,476 | 1/1995 | Bisgaard et al. | 381/69 |
| 5,402,095 | 3/1995 | Janniere | 235/441 |
| 5,404,407 | 4/1995 | Weiss | 381/68 |
| 5,410,141 | 4/1995 | Koenck et al. | 235/472 |
| 5,413,499 | 5/1995 | Wright, Jr. et al. | 439/500 |
| 5,521,022 | 5/1996 | Petzl | 429/100 |

*Primary Examiner*—Gregory D. Thompson

[57] ABSTRACT

A battery compartment for use with an electrical device having a circuit to be powered by one or more batteries. The device has a housing for substantially housing the circuit and a surface with an aperture therethrough. Each battery has first and second terminals. The compartment includes a slidable drawer for insertion through the housing aperture and receipt of the battery, a plurality of connectors for electrical connection to the battery's terminals, and a plurality of conductors to eclectically connect the connectors to the device's circuit. The drawer is movable between an open position exposing at least a portion of interior of the drawer, and a closed position. An aesthetically pleasing, easy to access compartment which does not consume surface area of the device's circuit and which maintains electrical connection of the battery to the circuit whether the door is in the open or closed positions results.

12 Claims, 5 Drawing Sheets

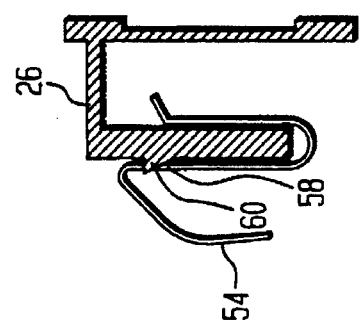
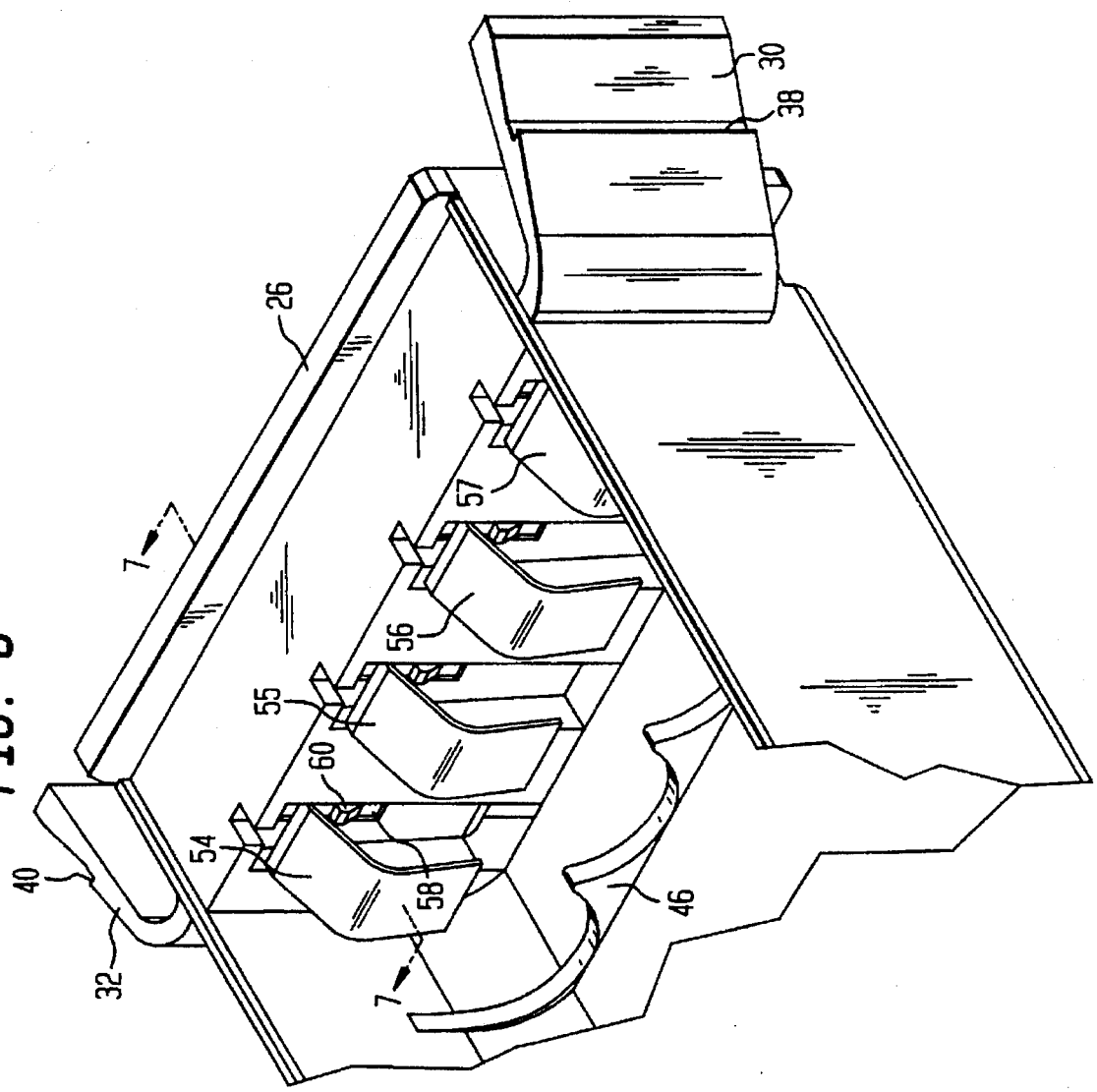

BATTERY DRAWER

FIELD OF THE INVENTION

The present invention relates to the field of battery compartments, and in particular to the provision of a battery drawer for receipt of and providing easy access to one or more batteries.

BACKGROUND OF THE INVENTION

Many of today's consumer electronics products include the provision of a battery power source. Some devices, such as cellular telephones, pagers, portable entertainment devices, and hand held toys, are totally dependent upon battery power to operate. Other devices, such as televisions, radios, alarm clocks, computers and telephones, are often connected to art external AC power source for general operation, but utilize a battery power source to perform backup functions and/or to retain programmed data stored in the device's memory upon a temporary loss of external electrical power. For example, television channel programming information is retained during a power outage; a clock radio continues to keep time in the event of a power outage so that the clock does not have to be reset upon restoration of power; and stored telephone numbers and user established functions are retained in a telephone in the event of a power outage.

Whether the battery or batteries in the electronic device serves as the primary or a secondary power source, the electronics product designer is necessarily concerned with several factors relating to the provision of battery power. First, after determining the level of power required to power the circuit or circuits of the device, the electrical designer decides on the number and type of batteries necessary to support the device's circuit(s). In some devices, such as hearing aids or watches, a single, small and simple button battery is all that is required and all that can be utilized due to physical constraints. In other devices, such as a portable stereo system, several batteries of larger dimension are required to provide sufficient power to the device. It is therefore desired to provide a battery compartment design that can be configured for use in a variety of different electrical devices and for varying numbers and sizes of batteries.

Another concern of the designer centers around the physical constraints imposed by the preferred size and shape of the device. The location of the batteries must permit easy access by the purchaser to change weakened or dead batteries, while not leading to inadvertent disconnection during operation. Also, an aesthetically pleasing product must result. In particular, the battery compartment housing the batteries should not detract from the overall appearance of the device, nor dictate the external appearance of the device, unless the device itself is very small. Further, it is desirable for the batteries to be positioned in such a way as to occupy a minimal amount of surface area of the device's printed circuit board (PCB). In many devices, physical size constraints result in making the surface area of the PCB at a premium and as much area as possible is needed to support the device's numerous capabilities and functions. Under such constraints, it is therefore undesirable to lay the batteries across the PCB.

When one or more cylindrically shaped batteries are required to power the device, a common design involves the provision of a compartment into which the batteries are stacked. Consider, for example, a full-size flashlight requiring two or more batteries to operate. The handle of the flashlight often accommodates a stack of batteries. Not only may such stacking be impractical due to physical constraints, stacking makes it very difficult for the consumer to ascertain in what orientation the batteries are to be installed in the battery compartment. Therefore, it is desirable to provide a battery compartment which does not require stacking of the batteries.

Even when batteries are not stacked, access to the battery compartment is often provided in a difficult to reach position. Further, when the consumer places batteries into the compartment, it is often difficult to ascertain the proper orientation of the batteries in the compartment. Therefore, it is desired to provide easy access to the battery compartment and to provide orientation information to facilitate proper battery placement by the consumer.

Another common battery compartment design involves the use of a recess formed in the bottom or underside portion of the device housing and the placement of a removable access door over the recess. A few of the shortcomings associated with this design are the inconvenience of the location of the recess (requiring the device to be lifted in order to access the compartment), the awkwardness of removing and replacing the door, and the risk that the door itself will be lost or broken when removed from the housing. Therefore, it is desirable to provide a battery compartment that is positioned on a portion of the device's housing that is easy to access, which is easy to open and close, and which does not include removable parts which may be lost or broken when removed.

Some devices, such as hearing aids, attempt to overcome one or more of these shortcomings through the use of a pivotable compartment for retention of the battery in the device. Pivotable battery compartments are disclosed in U.S. Pat. Nos. 5,413,499, 5,404,407, 5,386,476, for example. A drawback associated with pivotable compartments is that the battery is automatically electrically disconnected from the device circuitry when the compartment is pivoted to the open position. Such electrical disconnection causes loss of memory and/or functionality during inspection of the batteries. Similar disconnection of the batteries occurs with devices having battery drawers, such as is disclosed in U.S. Pat. Nos. 5,280,273 and 5,113,183. Devices having battery packs, such as that of U.S. Pat. Nos. 5,410,141 and 5,023,824, for example, are also disconnected from the device's circuitry when the battery pack is removed from the battery pack compartment. It is therefore desirable to provide a compartment in which the battery(ies) held by the compartment may be inspected, as for determining the strength of the battery, without disconnecting the battery from the device's circuitry. In this manner, if the battery(ies) are used to retain functions or data in memory, those functions or data will not be lost by inspection of the battery(ies) in the compartment.

In resolving the above-stated shortcomings and disadvantages of the prior art, cost containment must also be a consideration for a battery compartment. The compartment should be comprised of few inexpensive parts and be easy to assembly, thereby minimizing the costs associated with manufacture of the battery compartment.

SUMMARY OF INVENTION

The present invention provides a battery compartment for use with an electrical device having a circuit to be powered by one or more batteries held in the compartment. The compartment comprises a slidable drawer for receipt of the batteries, and includes connectors to electrically connect the battery(ies) to the circuit when the drawer is in its open and closed positions.

According to the present invention, an electrical device includes a housing having at least one surface and an aperture therethrough. The housing substantially houses a circuit to be powered by at least one battery. Each battery includes a first and second terminal. The compartment includes a slidable drawer, a plurality of connectors, and a plurality of conductors. The drawer is sized for receipt of the at least one battery and for insertion through the aperture in the housing. The drawer includes a from surface and an interior cavity which receives the at least one battery. The drawer is movable between an open position in which at least a portion of the interior cavity resides outside the housing surface, and a closed position in which the front surfaces of the drawer is substantially flush with the housing surface. A plurality of connectors are connected to the drawer for electrical connection of the terminals of the at least one batteries. Finally, the compartment includes a plurality of conductors connected to the plurality of connectors and the circuit to electrically connect the at least one battery to the circuits when the door is in both the open and closed positions.

In one embodiment, the slidable drawer is advantageously arranged to house a plurality of batteries.

The present invention provides an aesthetically pleasing compartment that may be used for a variety of electrical devices and for various numbers, sizes and types of batteries. The design of the compartment does not detract from nor dictate the design of the device. Also, by locating the drawer in a remote position relative to the device's circuit, surface area of the printed circuit board is not consumed by the presence of the batteries. Further, the electrical connection of the batteries to the circuit is achieved whether the drawer is in the open or closed positions. In this manner, the batteries may be inspected without disconnecting the batteries. Also, the drawer may be positioned to make it easy for a person to ascertain the proper orientation of batteries in the compartment. The compartment includes no removable parts which may be lost or broken by a person accessing the batteries. All the above advantages are accomplished in a compartment that is easy and inexpensive to manufacture and install.

The above discussed features, as well as additional features and advantages of the present invention, will become more readily apparent by reference to the following detailed description and the accompanying drawings.

BRIEF DESCRIPTION OF THE DRAWINGS

FIG. 6 illustrates a partial perspective view of the battery compartment illustrated in FIGS. 1 and 2; and FIG. 7 illustrates a cross sectional view of a battery terminal of the battery compartment of FIG. 6 taken at line 7—7.

DETAILED DESCRIPTION OF THE DRAWINGS

Figure 1:
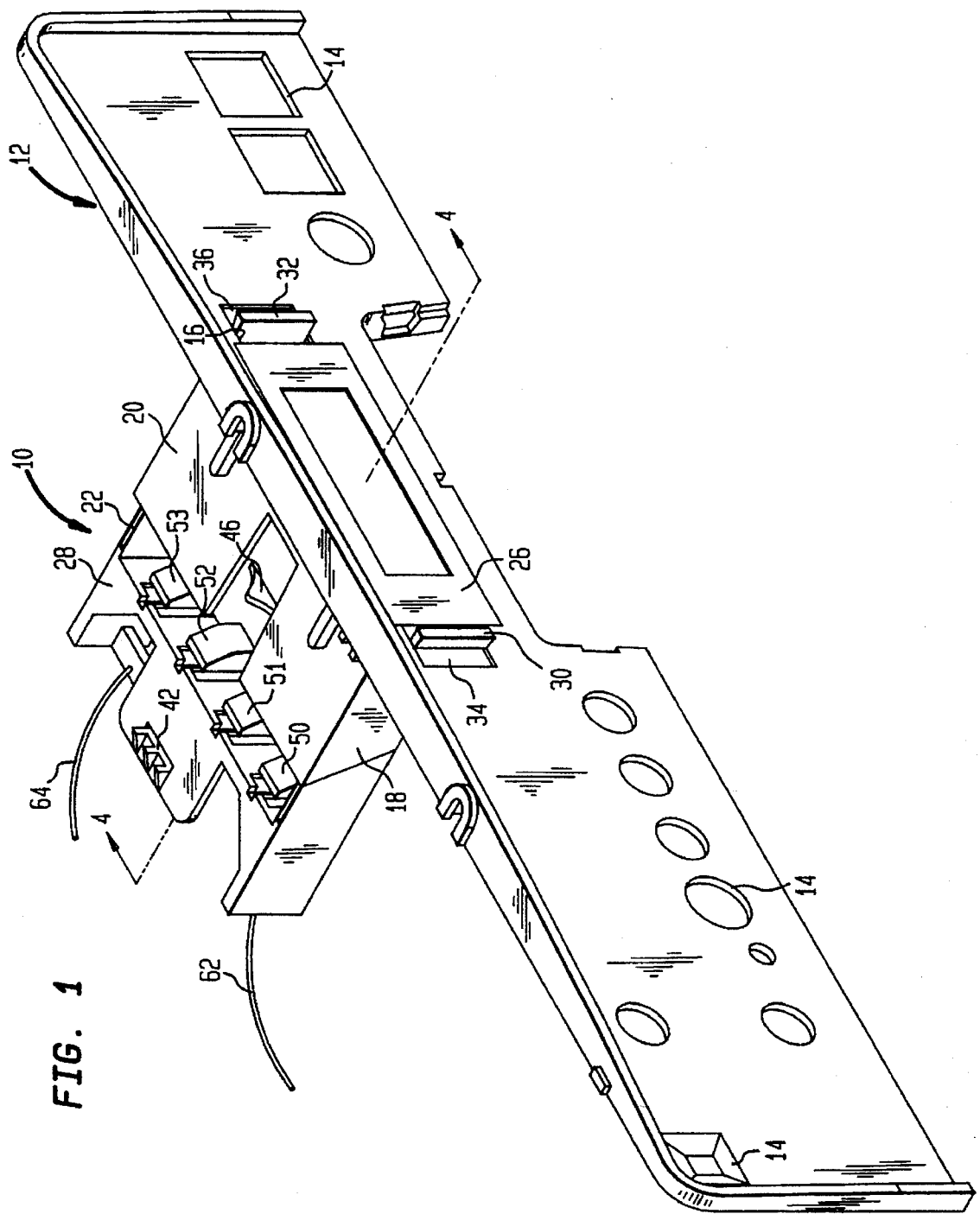
FIG. 1 illustrates a perspective view of an exemplary embodiment of the battery drawer according to the present invention in which the drawer is in a closed position.

FIG. 1 illustrates a perspective view of an exemplary embodiment of the battery drawer according to the present invention in which the drawer is in a closed position. In this embodiment, the battery compartment 10 is slidably attached to a housing 12. The housing 12 comprises the rear exterior surface of an electrical appliance or device, such as a home entertainment center, radio, clock, and the like. Extending through the housing 12 are several apertures 14 to permit access to switches and connectors (not shown) of the electrical device. The housing 12 also includes a drawer aperture 16 extending therethrough for receipt of the battery compartment 10, and first and second drawer guides 18 and 20, respectively, to guide the sliding of the battery compartment 10 through the drawer aperture 16. In this embodiment, the housing 12 and the first and second drawer guides 18 and 20 are formed from a single piece of ABS plastic.

Figure 2:
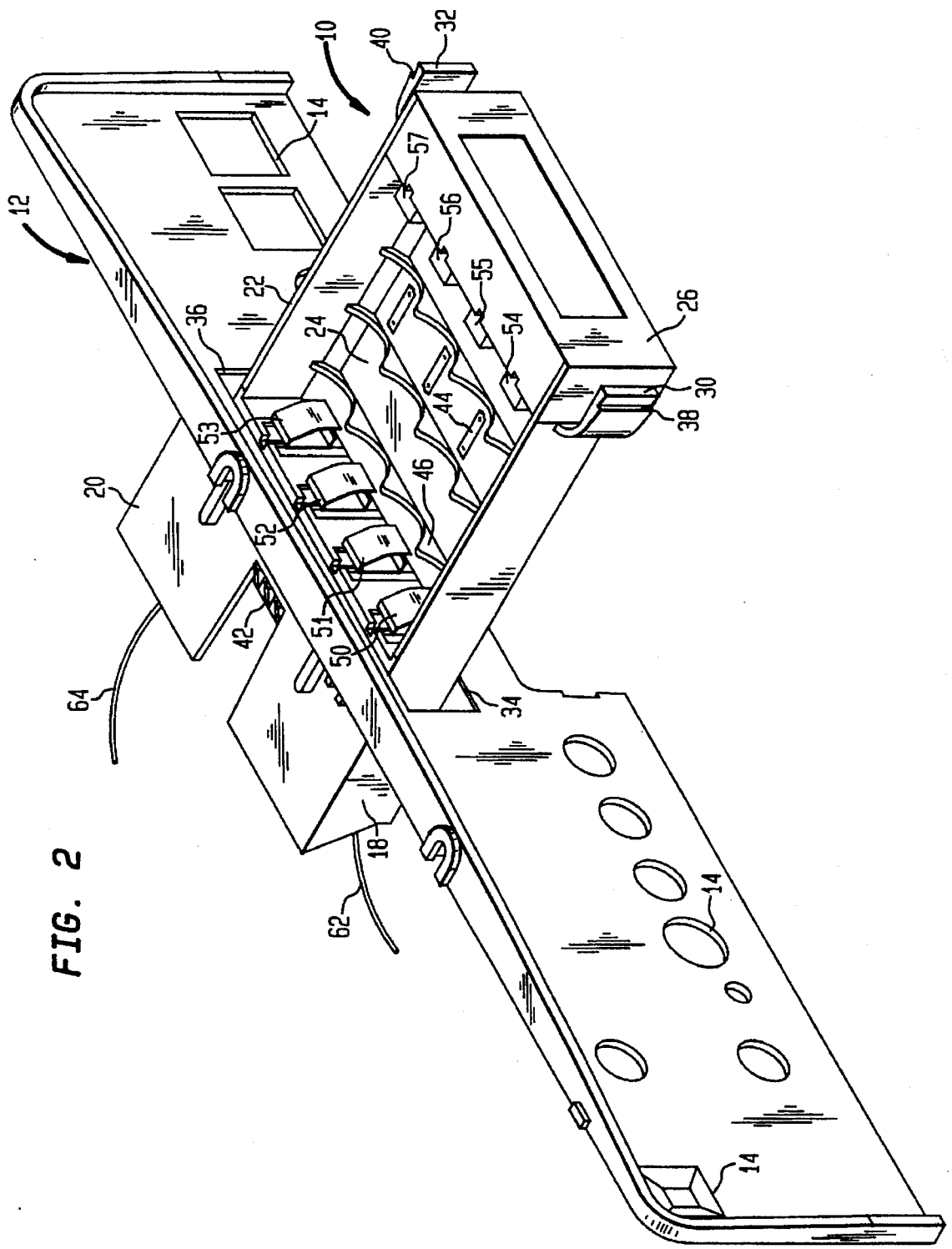
FIG. 2 illustrates a perspective view of the battery compartment of the embodiment of FIG. 1 in which the drawer is in an open position.

FIG. 2 illustrates a perspective view of the battery compartment of the embodiment of FIG. 1 in which the drawer is in an open position. The battery compartment 10 comprises a drawer 22 having an interior cavity 24 for receipt of the batteries (not shown) to be used to power at least a portion of the circuitry of the electrical device. The battery compartment 10 also includes an aesthetically pleasing front face portion 26 which is substantially flush with the surface of the housing 12 when in the closed position as illustrated in FIGS. 1 and 3A, and a rear portion 28 (see FIG. 1).

Figure 5:
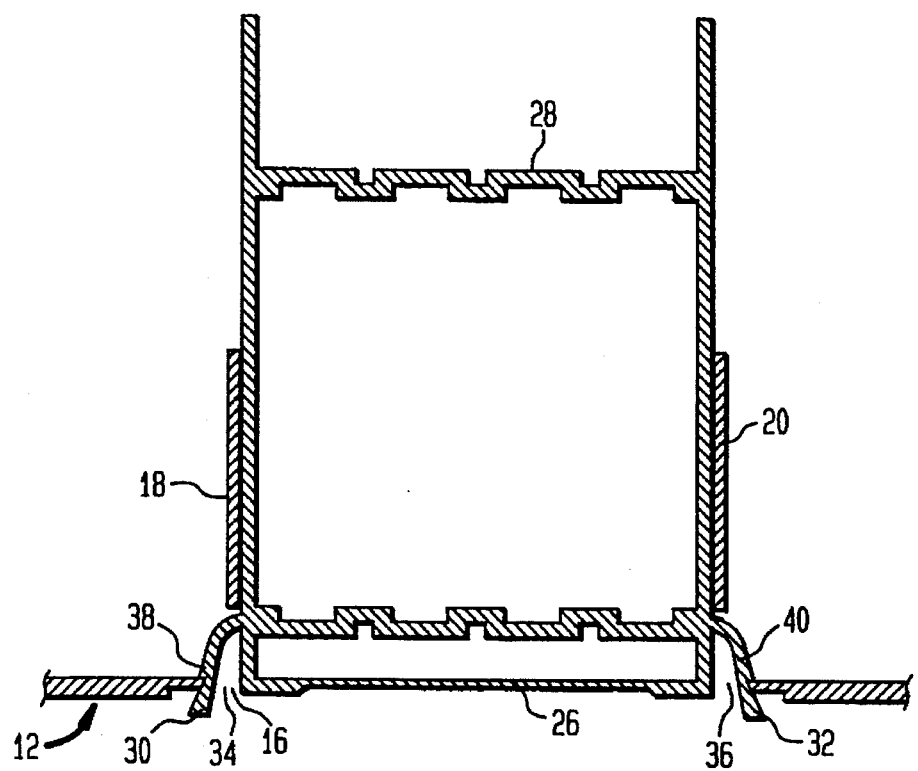
FIG. 5 illustrates a cross-sectional view taken of the drawer and drawer guides at line 5—5 of FIG. 3A.

Affixed to the drawer 22 toward and proximate to the front portion 26 are first and second opposing releasable, flexible members 30 and 32, respectively. Flexible members 30 and 32 are advantageously configured to lock the battery compartment 10 in the closed position as illustrated in FIGS. 1, 3A and 5. In this embodiment, the drawer 22, the front face portion 26, the rear portion 28, and the flexible members 30 and 32 are all constructed from a single piece of ABS plastic.

The drawer aperture 16 is wider than the width of the front face potion 26 of the battery compartment 10 such that first and second slots 34 and 36 are formed by the combination of the sides of the battery drawer 22 and the outside edges of the drawer aperture 16 when the battery compartment 10 is inserted into the drawer aperture 16. Slots 34 and 36 are formed regardless of whether the battery compartment 10 is in its open position (see FIGS. 2 and 3B) or its closed position (see FIGS. 1, 3A and 5).

Figure 3A:
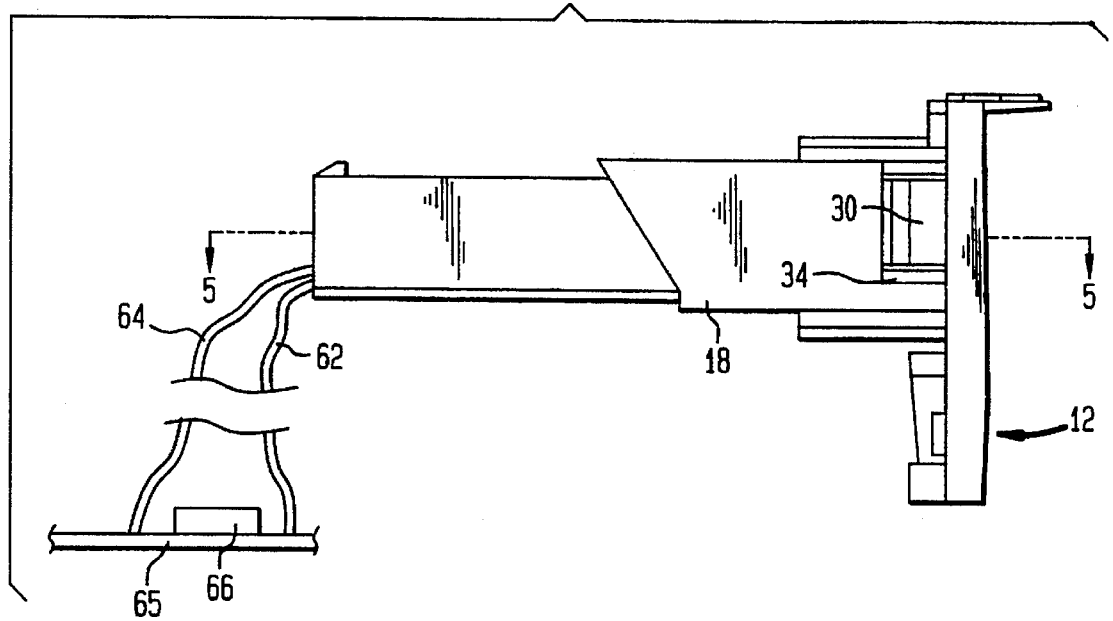
FIGS. 3A and 3B illustrate side views of the embodiment of FIGS. 1 and 2 in which the drawer is in the closed and open positions, respectively.
Figure 3B:
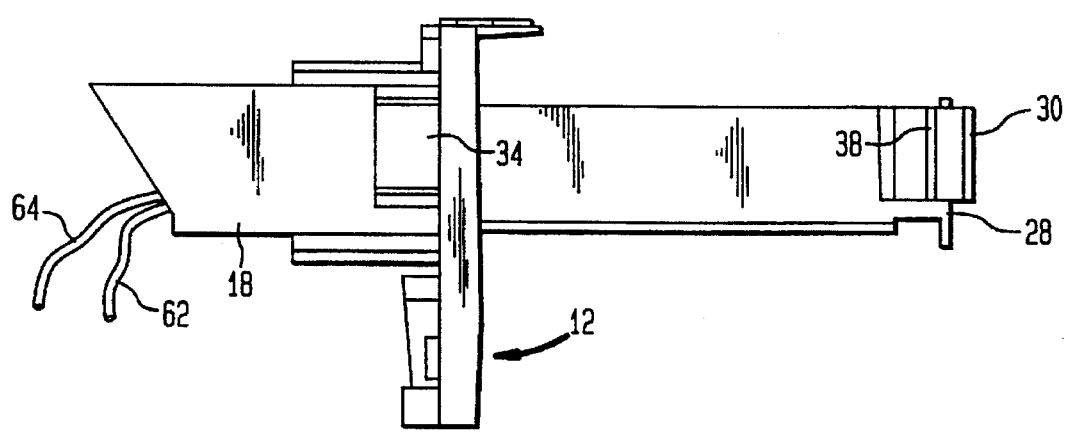

Considering now the slidable movement of the battery compartment 10 with respect to the housing 12, when in the closed position illustrated in FIGS. 1, 3A and 5, first and second flexible members 30 and 32 reside within the first and second slots 34 and 36, respectively. Both the notch 38 formed in first flexible member 30 and the notch 40 of the second flexible member 32 engage the housing 12 as shown in FIG. 5. In this manner, the battery compartment 10 is locked in the closed position with the interior cavity 24 substantially residing inside the housing 12, and with the front face portion 26 substantially flush with the housing 12. The forward edges of first and second flexible members 30 and 32 may, however, extend slightly forward beyond the surface of the housing 12 and the face portion 26 of the battery compartment 10, so that the flexible members 30 and 32 may be disengaged from locking contact with the housing 12 as described in greater detail herein.

To move the battery compartment 10 from the closed position to the open position, a person places inward forces on the first and second flexible members 30 and 32 and simultaneously pulls the battery compartment 10 forward away from the housing 12. The inward forces disengage the notches 38 and 40 from contact with the housing 12 so that the battery compartment 10 may be slid forward to the open position.

Figure 4:
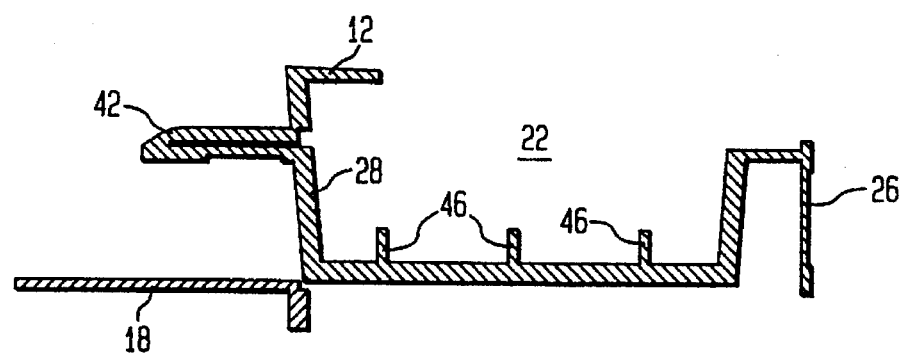
FIG. 4 illustrates a cross-sectional view of the drawer and drawer guides taken at line 4—4 of FIG. 1.

In the exemplary embodiment illustrated in FIGS. 1 through 7, the battery compartment 10 includes a mechanism for preventing the battery compartment 10 from inadvertently being removed (completely slid out from and away from) the housing 12. This stop mechanism comprises a stop 42 formed on the rear portion 28 of the battery compartment 10. The stop 42 comprises at least one raised portion or notch for engagement with the housing 12 when in the completely open position as shown in FIGS. 2 and 4.

The stop 42 is a flexible stop member, and in the present embodiment is also comprised of ABS plastic. The flexibility of the stop 42 permits for easy installation of the battery compartment 10 during assembly of the electrical device as well as removal of the battery compartment 10 from the housing 12, as may be desirable for repair or maintenance of the device, for example. Specifically, if a downward force is applied to flexible stop member 42, stop member 42 does not engage the housing 12. However, once installed and during normal use, stop member 42 prevents the battery compartment 10 from being separated from the housing 12.

Returning now to FIG. 2, further discussion regarding the battery compartment 10 is warranted to explain the placement and electrical connection of batteries in the battery compartment 10. The embodiment of FIGS. 1–8 is designed to accept four "AA" batteries—batteries having positive and negative terminals on opposing ends thereof. To assist a person in ascertaining the proper orientation of batteries in the drawer 22 of battery compartment 10 are orientation markings 44. Orientation markings 44 may be formed as a part of the bottom of the drawer 22 or may be etched therein. In this embodiment, instructions to the person as to proper battery size and type are also provided in the phrase "AA" ALKALINE BATTERIES ONLY.

To support the longitudinal axes of the batteries and to further ensure proper placement of the batteries in the drawer 22, three formed standoffs 46 are disposed on the bottom of the drawer 22. In this embodiment, standoffs 46 are formed as an integral part of the bottom of the drawer 22, but other standoffs may be attached to the drawer 22 and still remain within the scope of the insertion.

Considering the electrical connection of batteries wig the battery compartment 10, attached to the front portion 26 and the rear portion 28 of the compartment 10 are a plurality of battery terminal connectors 50, 51, 52, 53, 54, 55, 56, and 57. A cross sectional view of the connection of the fifth terminal connector 54 to the front portion 26 is illustrated in FIG. 7 and a magnified partial perspective view of the connection of the fifth through eighth terminal connectors 54, 55, 56 and 57 is shown in FIG. 6.

The terminal connectors 50 . . . 57 comprise leaf spring connectors made of conductive material, such as ferrous metal or aluminum. As shown in connection with the fifth terminal connector 54 in FIG. 7 and representative of all terminal connectors 50 . . . 57, fifth terminal connector 54 is S-shag and has an aperture 58 therethrough for engagement with a notch 60 on front face portion 26.

In the exemplary embodiment of FIGS. 1–7, second and third terminal connectors 51 and 52 are actually connected to each thereby a conductive portion (not shown). Thus, second and third terminal connectors 51 and 52 comprise a single conductor. Similarly, fifth and sixth terminal connectors 54 and 55 are electrically connected to each other, as are seventh and eighth electrical connectors 56 and 57.

Therefore, when four batteries are positioned in the battery compartment 10 according to the orientation markings 44 and are electrically engaging the terminal connectors 50 . . . 57, the batteries are electrically connected to each other in series, with one terminal point at first terminal connector 50 and the other terminal point at fourth terminal connector 53.

The terminal connectors 50 . . . 57 used in the compartment 10 are inexpensive to manufacture and easy to install into the battery compartment. It will nevertheless be appreciated that other terminal connectors well known in the art may readily be employed with the battery compartment of the present invention.

When batteries are received by the drawer 22 of the battery compartment, electrical connection of the batteries to the device circuitry is made through first and second conductors 62 and 64, respectively. As illustrated in FIG. 3A, the device housed within housing 12 includes circuitry, at least a portion of which is to be powered by the batteries. Illustrated is printed circuit board 65 housing chip 66 thereon which is to be electrically connected to batteries held within battery compartment 10. First conductor 62 is connected to first terminal connector 50 and second conductor 64 is connected to fourth terminal connector 53. Both the first and second conductors are connected to printed circuit board 65 for provision of power to chip 66. These connections may be by soldering, use of receiving connectors, or other means well known in the art.

It will be appreciated by those of skill in the art that the implementation of a battery compartment according to the present invention facilitates the development of an aesthetically pleasing product. For example, in the embodiment described herein, the front face potion 26 of the compartment 10 is substantially flush with the housing 12, and only the releasable, flexible members 30 and 32 slightly protrude. Thus, the compartment 10 is identifiable by a person needing to access batteries held by the compartment 10, but does not detract from nor dictate the overall appearance of the device or product. It will be appreciated, however, that neither the housing 12 nor the front face portion 26 of the battery compartment 10 are required to be flat. Numerous materials are available to permit other shapes and contours. The front face portion 26 also need not be substantially flush with the housing 12 unless so desired for aesthetic or structural reasons, for example.

It will also be appreciated that the one piece construction of the exemplary embodiment is easy and inexpensive to manufacture. Further, the compartment contains no movable parts subject to loss or damage. Also, the compartment may be easily installed into the housing and may also be removed therefrom with relative ease.

It will be further appreciated that the battery compartment of the present invention provides an easy to access compartment for the batteries which provides clearly visible information to ensure the proper orientation, size and type of batteries to be placed into the compartment. When the compartment is in the open position, the person is generally viewing the interior 24 of the compartment 10 from above making orientation markings 44 or other markings clearly visible to the person.

It will be still further appreciated that the use of the battery compartment of the present invention conserves space on the device's circuitry. Specifically, by locating the batteries remote from the device's circuitry, surface area of the circuitry is not consumed by the presence of batteries or battery connectors. Rather, only the conductors connecting the batteries to the circuitry consume surface area of the circuitry.

It will also be appreciated that batteries held in the compartment may be inspected, as for level of charge or the presence of acidic erosion, without requiring removal of the batteries from the compartment, and without disconnecting the batteries from the device circuitry. This advantage is realized because the connection between the battery drawer and the device circuitry is independent from the position of the drawer. In contrast, in prior art drawers the electrical connection to the batteries is only made when the drawer is in the closed position.

The compartment 10 may readily be modified by those of skill in the art to employ various mechanisms for the flexible latch members 30 and 32 and the flexible stop member 42 and still be within the scope of the invention. Tabs, spring loaded mechanisms, and latches and other mechanisms are suitable for use with the battery compartment of the present invention. It will also be recognized by those of skill in the art that the flexible latch members 30 and 32 also serve as a means for stopping the drawer from being inserted through the housing into the interior thereof. Alternatively, other stop mechanisms may be employed for this purpose.

Those of skill in the art may also readily modify the compartment 10 to use guiding mechanisms other than the drawer guides 18 and 20. The specific drawer guides 18 and 20 are advantageous in that they, together with the housing, are of unitary construction; thereby reducing the costs of manufacture. Further, by surrounding the sides of the drawer, stability is provided for maintaining the proper orientation of the drawer with respect to the housing. Such stability is desirable, for example, to prevent breakage or removal of the drawer in the event a person inadvertently bumps the drawer when in the open position. However, other mechanisms, such as the use of guide rails extending rearward from the housing combined with tracks along the sides of the drawer, are acceptable and remain within the scope and spirit of the invention.

The compartment 10 may readily be modified by those of skill in the art to accommodate various numbers, sizes and shapes of batteries. It is also possible to connect the batteries held by the compartment in parallel, series, or in a combination thereof to meet the battery power source requirements of the device. Further, alternative non-conductive materials may be used to form the drawer of the present invention, including, for example, polycarbonate, polypropylene, nylon, acrylic, ceramic, wood, etc. Also, the compartment may likewise be composed of materials other than ABS plastic.

It will be appreciated that the above embodiments are merely illustrative and that those of ordinary skill in the art may readily envision or develop other embodiments that incorporate the principles of the present invention and fall within the scope and spirit thereof.

I claim:

1. A battery compartment for use with an electrical device having a circuit to be powered by one or more batteries, the device having a housing for substantially housing the circuit, the housing having a surface with an aperture therethrough, and each of the one or more batteries having a first and second terminal, the battery compartment comprising:

a slidable drawer sized for insertion through the aperture of the housing, the drawer having an interior cavity, the drawer movable between an open position in which at least a portion of the interior cavity of the drawer resides outside the housing surface, and a closed position in which the interior cavity resides substantially inside the housing surface;

a plurality of connectors for connection to the terminals of the one or more batteries, the connectors connected to the drawer; and a plurality of conductors for Connecting the plurality of connectors to the circuit of the device when the door is in the open and closed positions.

2. The battery compartment of claim 1, wherein the drawer further comprises a front surface, such that when the drawer is in the closed position, the front surface of the drawer is substantially flush with the housing surface.

3. The compartment of claim 1, further comprising:

a stop member affixed to the drawer, the stop member operably located to engage the housing surface to prevent inadvertent removal of the drawer therefrom.

4. The compartment of claim 1, further comprising:

a stop member affixed to the drawer, the stop member operably located to engage the housing surface to prevent inadvertent insertion of the drawer through the housing surface into the inside thereof and disengaged from the housing surface.

5. The compartment of claim 1, wherein the housing further comprises at least one edge forming the aperture, the compartment further comprising:

at least one flexible latch member disposed proximate the front surface of the drawer for locking engagement with at least one edge of the housing forming the aperture.

6. The compartment of claim 5, wherein the at least one flexible latch member and the drawer are of unitary construction.

7. An electrical device, comprising:

a) a housing having at least one surface and an aperture therethrough;

b) a battery having first and second terminals;

c) at least one electrical circuit within the housing, the at least one circuit to be powered by the battery, the circuit having first and second electrical contacts;

d) a compartment for receipt of the battery, the compartment comprising:

a slidable drawer for insertion into the aperature of the housing, the drawer having an interior cavity, the drawer movable between an open position in which at least a portion of the interior of the drawer resides outside the housing surface and a closed position in which the interior cavity resides substantially inside the surface of the housing, the drawer further comprising a flexible member for locking the drawer into the closed position, the flexible member positioned at the front of the drawer, and the housing further comprises a slot for engaging the flexible member when the drawer is in the closed position, and first and second terminal connectors, such that when the battery is placed into the compartment, the first terminal of the battery is operably connected to the first terminal connector and the second terminal of the battery is operably connected to the second terminal of the battery; and e) first and second conductors, the first conductor connecting the first electrical contact of the circuit with the first terminal connector of the compartment and the second conductor connecting the second electrical conductor to the second terminal connector, such that when a battery is received by the compartment, electrical connection of the battery to the circuit is maintained when the drawer is in both the open and closed positions.

8. The device of claim 7, wherein the drawer further comprises an opposing flexible member disposed at the front face of the drawer, and wherein the housing further comprises an opposing slot for receipt of the opposing flexible member for locking engagement of the drawer in the closed position.

9. The device of claim 7, wherein the compartment further comprises:

a stop member connected to the drawer, the stop member positioned to prevent inadvertent disengagement of the compartment from the housing.

10. A battery compartment for use with an electrical device having a circuit to be powered by one or more batteries, the device having a housing for substantially housing the circuit, the housing having a surface with an aperture therethrough, the housing further comprising at least one edge forming the aperture, and each of the one or more batteries having a first and second terminal, the battery compartment comprising:

a slidable drawer sized for insertion through the aperture of the housing, the drawing having an interior cavity, the drawer movable between an open position in which at least a potion of the interior cavity of the drawer resides outside the housing surface, and a closed position in which the interior cavity resides substantially inside the housing surface;

a stop member affixed to the drawer, the stop member operably located to engage the housing surface to prevent inadvertent removal of the drawer therefrom;

at least one flexible latch member disposed proximate the front surface of the drawer for locking engagement with at least one edge of the housing forming the aperture;

a plurality of connectors for connection to the terminals of the one or more batteries, the connectors connected to the drawer; and a plurality of conductors for connecting the plurality of connectors to the circuit of the device when the door is in the open and closed positions.

11. The compartment of claim 10, wherein the at least one flexible latch member and the drawer are of unitary construction.

12. The compartment of claim 10, wherein the drawer further comprises an opposing flexible latch member disposed at the front face of the drawer.

* * * * *